United States Patent
Rapp et al.

(10) Patent No.: US 11,904,874 B2
(45) Date of Patent: *Feb. 20, 2024

(54) CONTROL ARCHITECTURE FOR A VEHICLE

(71) Applicant: KNORR-BREMSE Systeme fuer Nutzfahrzeuge GmbH, Munich (DE)

(72) Inventors: Tamas Rapp, Budapest (HU); Huba Nemeth, Budapest (HU); Peter Szell, Budapest (HU); Csaba Kokrehel, Budapest (HU); Adam Bardos, Martonvasar (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 289 days.

This patent is subject to a terminal disclaimer.

(21) Appl. No.: 17/277,174

(22) PCT Filed: Sep. 4, 2019

(86) PCT No.: PCT/EP2019/073523
§ 371 (c)(1),
(2) Date: Mar. 17, 2021

(87) PCT Pub. No.: WO2020/057971
PCT Pub. Date: Mar. 26, 2020

(65) Prior Publication Data
US 2022/0009508 A1   Jan. 13, 2022

(30) Foreign Application Priority Data
Sep. 18, 2018 (EP) ................................. 18195302

(51) Int. Cl.
*B60W 50/023* (2012.01)
*B60R 16/023* (2006.01)
(Continued)

(52) U.S. Cl.
CPC ....... *B60W 50/023* (2013.01); *B60R 16/0231* (2013.01); *B60T 8/885* (2013.01); *B60T 2270/402* (2013.01); *B62D 5/0481* (2013.01)

(58) Field of Classification Search
CPC ........ B60W 50/023; B60W 2050/0002; B60R 16/0231; B60T 2270/402; B60T 2270/413;
(Continued)

(56) References Cited

U.S. PATENT DOCUMENTS

| 4,610,013 A | 9/1986 | Long et al. |
| 6,256,570 B1 | 7/2001 | Weiberle et al. |

(Continued)

FOREIGN PATENT DOCUMENTS

| CN | 101137529 A | 3/2008 |
| CN | 101889155 A | 11/2010 |

(Continued)

OTHER PUBLICATIONS

Japanese-language Office Action issued in Japanese Application No. 2021-538908 dated Oct. 18, 2022 with English translation (nine (9) pages).

(Continued)

*Primary Examiner* — James M McPherson
*Assistant Examiner* — Kyle J Kingsland
(74) *Attorney, Agent, or Firm* — Crowell & Moring LLP

(57) ABSTRACT

A control architecture for a vehicle connects a first control unit to a first vehicle communication network. A second control unit is connected to a second vehicle communication network. Commands are received by a plurality of commanded units from the first control unit and/or the second control unit over communication lines. An interlink communication line is connected between the first control unit to the second control unit.

8 Claims, 1 Drawing Sheet

(51) Int. Cl.
*B60T 8/88* (2006.01)
*B62D 5/04* (2006.01)

(58) Field of Classification Search
CPC ......... H04L 12/40182; H04L 12/40176; H04L 12/40202; G05B 9/03
See application file for complete search history.

(56) References Cited

U.S. PATENT DOCUMENTS

| | | | |
|---|---|---|---|
| 9,195,232 | B1 | 11/2015 | Egnor et al. |
| 2004/0015281 | A1 | 1/2004 | Weiberle |
| 2004/0195460 | A1 | 10/2004 | Sailer |
| 2005/0067887 | A1 | 3/2005 | Nilsson et al. |
| 2006/0253726 | A1* | 11/2006 | Kukshya ............... G06F 11/202 |
| | | | 714/E11.078 |
| 2007/0170774 | A1 | 7/2007 | Gerum et al. |
| 2007/0282459 | A1 | 12/2007 | Schafer et al. |
| 2008/0312790 | A1 | 12/2008 | Fey et al. |
| 2010/0257970 | A1 | 10/2010 | Giefer et al. |
| 2012/0145502 | A1 | 6/2012 | Moorman et al. |
| 2015/0134199 | A1 | 5/2015 | Fraser-Chanpong et al. |
| 2016/0009257 | A1 | 1/2016 | Joyce et al. |
| 2016/0047468 | A1 | 2/2016 | Hummel |
| 2017/0072920 | A1 | 3/2017 | Besier et al. |
| 2017/0175863 | A1 | 6/2017 | Kramer et al. |
| 2019/0241207 | A1* | 8/2019 | Jeong .................. B62D 15/021 |

FOREIGN PATENT DOCUMENTS

| | | | |
|---|---|---|---|
| CN | 102563053 | A | 7/2012 |
| CN | 105051427 | A | 11/2015 |
| CN | 105121915 | A | 12/2015 |
| CN | 105700519 | A | 6/2016 |
| CN | 106415063 | A | 2/2017 |
| CN | 106898132 | A | 6/2017 |
| DE | 198 26 132 | A1 | 12/1999 |
| DE | 10 2007 058 849 | A1 | 6/2009 |
| DE | 10 2015 206 572 | A1 | 11/2015 |
| JP | 7-127739 | A | 5/1995 |
| JP | 2006-525172 | A | 11/2006 |
| JP | 2008-160468 | A | 7/2008 |
| JP | 2010-534591 | A | 11/2010 |
| JP | 2012-205084 | A | 10/2012 |
| JP | 2017-180603 | A | 10/2017 |
| JP | 2017-219051 | A | 12/2017 |
| JP | 2018-50438 | A | 3/2018 |
| RU | 2 333 528 | C2 | 9/2008 |
| WO | WO 2004/098967 | A2 | 11/2004 |
| WO | WO 2005/080164 | A1 | 9/2005 |
| WO | WO 2005/110829 | A1 | 11/2005 |

OTHER PUBLICATIONS

Japanese-language Office Action issued in Japanese Application No. 2021-541161 dated Aug. 23, 2022 with English translation (12 pages).
International Search Report (PCT/ISA/210) issued in PCT Application No. PCT/EP2019/073523 dated Oct. 31, 2019 (four (4) pages).
Written Opinion (PCT/ISA/237) issued in PCT Application No. PCT/EP2019/073523 dated Oct. 31, 2019 (five (5) pages).
Extended European Search Report issued in European Application No. 18195302.7 dated Mar. 4, 2019 (eight (8) pages).
Korean-language Office Action issued in Korean Application No. 10-2021-7010907 dated May 12, 2022 with English translation (10 pages).
Hindi-language Office Action issued in Indian Application No. 202137009796 dated Oct. 1, 2021 with English translation (five (5) pages).
Japanese-language Office Action issued in Japanese Application No. 2021-538908 dated May 9, 2022 with English translation (eight (8) pages).
Russian-language Office Action issued in Russian Application No. 2021110508/11(022545) dated Oct. 29, 2021 with English translation (nine (9) pages).
Japanese-language Office Action issued in Japanese Application No. 2021-541161 dated Jan. 17, 2023 with English translation (five (5) pages).
Chinese-language Office Action issued in Chinese Application No. 202080009551.8 dated Apr. 20, 2023 with partial English translation (13 pages).
Chinese-language Office Action issued in Chinese Application No. 201980061074.7 dated Apr. 27, 2023 with partial English translation (9 pages).

* cited by examiner

CONTROL ARCHITECTURE FOR A VEHICLE

FIELD OF THE INVENTION

The present invention relates to a control architecture for a vehicle, and a control method for a control architecture of a vehicle.

BACKGROUND OF THE INVENTION

A motor vehicle contains several subsystems that can jointly realize vehicle operations such as the propulsion and transmission system, steering system, braking system, where each subsystem is controlled by their associated control unit. A malfunction of a subsystem, in the actuator or at an individual control system level, may prevent the further operation of the vehicle or can cause at least a degradation of its functionalities. For automated driving the safety relevant systems like braking and steering require redundant setup and appropriate communication between them.

U.S. Pat. No. 9,195,232 describes methods and systems for compensating for common failures in fail operational systems. An example system may include a primary controller configured to perform functions of a vehicle such as propulsion braking and steering and a secondary controller configured in a redundant configuration with the primary controller. The controllers may perform cross-checks of each other and may each perform internal self-checks as well. Additionally the system may include a control module configured to transfer control of the vehicle between the controllers based on detecting a fault. The control module may detect a common fault of the controllers that causes the control module to output a common fault signal. In response the system may transfer of control to a safety controller configured to perform the vehicle functions until the system may transfer control back to the primary controller.

US20160009257 describes that a system includes an autonomous sub-system that includes first and second braking modules. Each of the modules includes a processor and a memory the memory storing instructions executable by the processor for detecting a fault. The system further includes a brake sub-system programmed to actuate a brake mechanism in response to a signal from the second braking module. The autonomous sub-system is further programmed to select one of the braking modules to provide a signal to the brake mechanism depending on whether a fault is detected.

However, there is a need to provide an improved system redundancy.

Therefore, it would be advantageous to have an improved system redundancy for a vehicle.

SUMMARY OF THE INVENTION

This need is met with the subject matter of the independent claims, wherein further embodiments are incorporated in the dependent claims. It should be noted that the following described aspects of the invention apply also for the control architecture for a vehicle and the control method for a control architecture of a vehicle.

In a first aspect, there is provided a control architecture for a vehicle, the control architecture comprising:

a first control unit;
a second control unit;
a first vehicle communication network circuit;
a second vehicle communication network circuit; and
a plurality of commanded units;

The first control unit is connected to the first vehicle communication network. The second control unit is connected to the second vehicle communication network. The plurality of commanded units are configured to receive commands from the first control unit and/or the second control unit over communication lines. An interlink communication line connects the first control unit to the second control unit.

In this manner, a control system architecture is provided that has redundancy, thereby improving safety and system performance.

In an example, the control architecture is configured to transmit data between the first vehicle communication network and the second control unit through utilisation of the interlink communication line. The control architecture is configured also to transmit data between the second vehicle communication network and the first control unit through utilisation of the interlink communication line.

In this manner, the situation where one of the communication fails is mitigated.

In an example, the first control unit is communicatively connected to all of the plurality of commanded components, and the second control unit is communicatively connected to all of the plurality of commanded components.

Thus, further system failure protection is provided in that if one of the control units fails, the other can continue to provide commands to all the commanded units, and this is enabled even if either of the communications networks also fails.

In an example, in a first mode of operation the first control unit is configured to act as a master controller and the second control unit is configured to act as a slave controller. In a second mode of operation the second control unit is configured to act as a master controller and the first control unit is configured to act as a slave controller.

In other words, the control units can take either a master or slave role, where one of them has the master role, while the other has a slave role.

In an example, the determination of the mode of operation comprises a communication over the interlink communication line.

In an example, the determination of the mode of operation is performed according to an algorithm and aligned over the interlink communication line.

In an example, the determination of the mode of operation is performed by the first control unit and/or the second control unit.

In an example, the first control unit and the second control unit are configured to utilise the interlink communication line to transmit data between the control units to perform a plausibility check and/or a crosscheck task.

In a second aspect, there is provided a control method for a control architecture of a vehicle, the method comprising:

a) connecting a first control unit to a first vehicle communication network;
b) connecting a second control unit to a second vehicle communication network;
c) receiving commands by a plurality of commanded units from the first control unit and/or the second control unit over communication lines; and
d) connecting an interlink communication line between the first control unit to the second control unit.

In an example, the method comprises:

e) transmitting data between the first vehicle communication network and the second control unit through the interlink communication line; or f) transmitting data between the second vehicle communication network and the first control unit through the interlink communication line.

The above aspects and examples will become apparent from and be elucidated with reference to the embodiments described hereinafter.

Exemplary embodiments will be described in the following with reference to the following drawings.

DETAILED DESCRIPTION OF EMBODIMENTS

Figure 1:
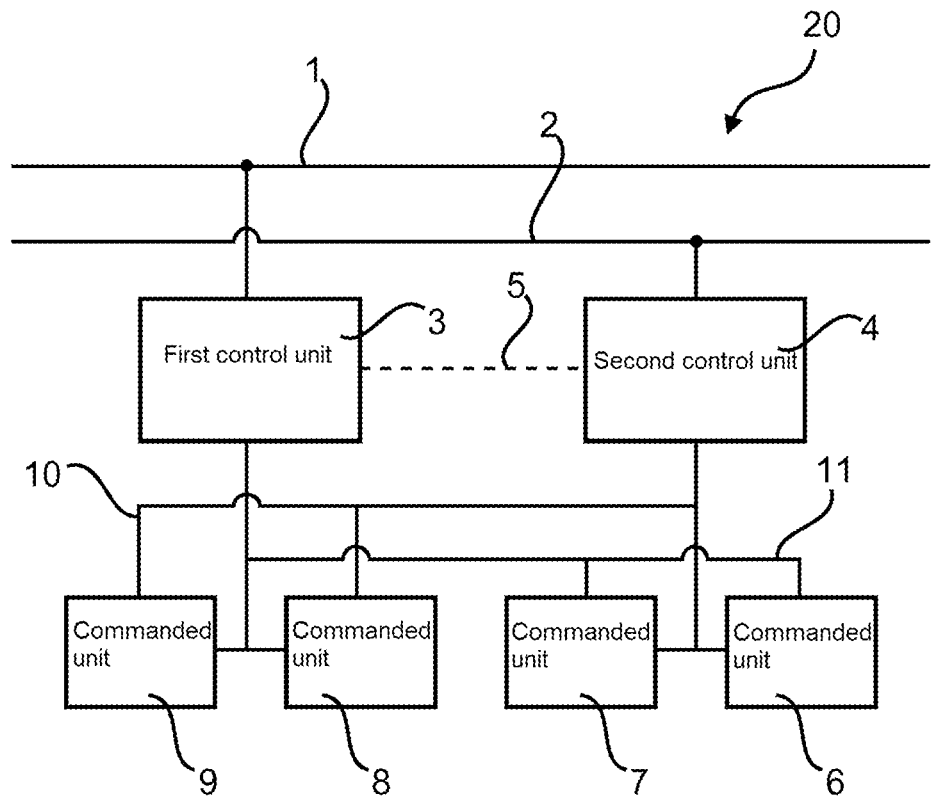
FIG. 1 is a schematic representation of an example of a control architecture for a vehicle.

FIG. 1 shows an example of a control architecture 20 for a vehicle. The control architecture comprises a first control unit 3, a second control unit 4, a first vehicle communication network circuit 1, a second vehicle communication network circuit 2, and a plurality of commanded units 6, 7, 8, 9. The first control unit is connected to the first vehicle communication network. The second control unit is connected to the second vehicle communication network. The plurality of commanded units are configured to receive commands from the first control unit and/or the second control unit over communication lines 10, 11. An interlink communication line 5 connects the first control unit to the second control unit. The example shown has two control units, but there could be more than two, with a first set of the control units being connected to the first vehicle communication network with the rest (a second set) being connected to the second vehicle communication network. Interlink communication lines would then connect the first set of control units to the second set of control units.

According to an example, the control architecture is configured to transmit data between the first vehicle communication network and the second control unit through utilization of the interlink communication line. The control architecture is configured also to transmit data between the second vehicle communication network and the first control unit through utilization of the interlink communication line.

According to an example, the first control unit is communicatively connected to all of the plurality of commanded components; and wherein the second control unit is communicatively connected to all of the plurality of commanded components.

According to an example, in a first mode of operation the first control unit is configured to act as a master controller and the second control unit is configured to act as a slave controller, and in a second mode of operation the second control unit is configured to act as a master controller and the first control unit is configured to act as a slave controller.

In an example, there can be more than two control units, with acting as the master and the rest acting as slaves. Thus, if there were three control units, then using the above nomenclature there can be three modes of operation, where in each mode a different control unit acts as the master, with the rest acting as slaves. This then applies for four, five six control units, where there would be four, five and six modes of operation, etc.

According to an example, the determination of the mode of operation comprises a communication over the interlink communication line.

According to an example, the determination of the mode of operation is performed according to an algorithm and the control units are aligned over the interlink communication line.

According to an example, the determination of the mode of operation is performed by the first control unit and/or the second control unit.

According to an example, the first control unit and the second control unit are configured to utilize the interlink communication line to transmit data between the control units to perform a plausibility check and/or a crosscheck task.

Figure 2:
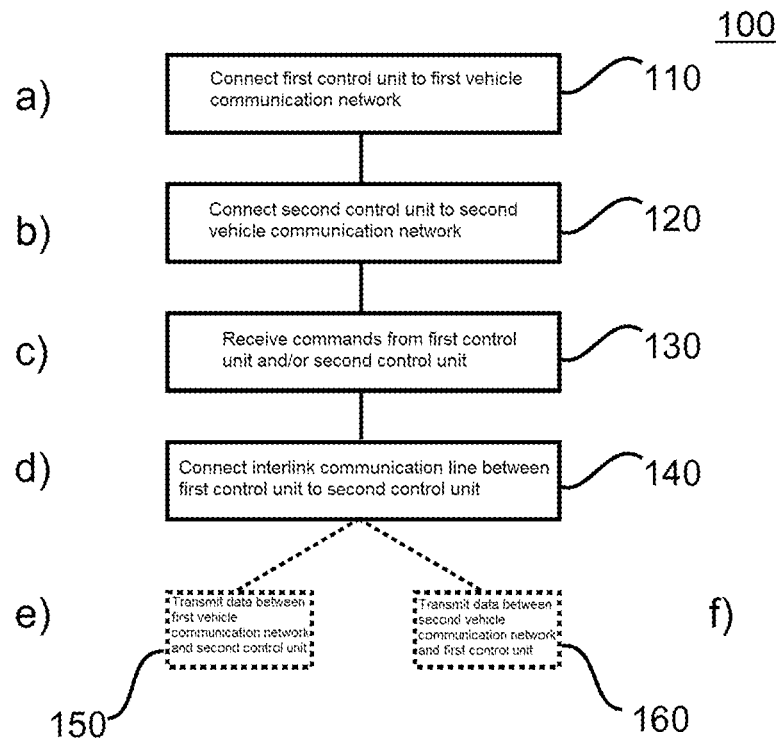
FIG. 2 shows a control method for a control architecture of a vehicle.

FIG. 2 shows a control method 100 for a control architecture of a vehicle in its basic steps, where optional steps are shown in dashed form. The method 100 comprises:

in a connecting step 110, also referred to as step a), connecting a first control unit 3 to a first vehicle communication network 1;

in a connecting step 120, also referred to as step b), connecting a second control unit 4 to a second vehicle communication network;

in a receiving step 130, also referred to as step c), receiving commands by a plurality of commanded units from the first control unit and/or the second control unit over communication lines 10, 11; and in a connecting step 140, also referred to as step d), connecting an interlink communication line 5 between the first control unit to the second control unit.

According to an example, the method comprises:

in a transmitting step 150, also referred to as step e), transmitting data between the first vehicle communication network and the second control unit through the interlink communication line; or in a transmitting step 160, also referred to as step f), transmitting data between the second vehicle communication network and the first control unit through the interlink communication line.

In an example, the first control unit is communicatively connected to all of the plurality of commanded components; and the second control unit is communicatively connected to all of the plurality of commanded components.

In an example, in a first mode of operation the first control unit acts as a master controller and the second control unit acts as a slave controller; and in a second mode of operation the second control unit acts as a master controller and the first control unit acts as a slave controller.

In an example, the determination of the mode of operation comprises a communication over the interlink communication line.

In an example, the determination of the mode of operation is performed according to an algorithm and aligned over the interlink communication line.

In an example, the determination of the mode of operation is performed by the first control unit and/or the second control unit.

In an example, the first control unit and the second control unit utilise the interlink communication line to transmit data between the control units to perform a plausibility check and/or a crosscheck task.

A detailed example is now described, again using FIG. 1. In this detailed example, a redundant controller architecture is shown, that has two control units 3, 4, each of them is connected to one of the redundant vehicle communication network circuits 1, 2. There is an interlink communication line 5 between the control units. Each control unit is connected to some commanded units 6, 7, 8, 9 by further control lines 10, 11, and each control unit can be connected to each of the commanded units as shown. One of the control units has a master role, while the other has a slave role. The determination of the master-slave role division is performed by the control units according to an appropriate algorithm and aligned through the interlink communication line.

In this way, having the interlink communication line between the control units makes it possible to mitigate the situation where one of the vehicle communication networks is in failure or down. In such a case data from the intact vehicle communication network can be transmitted to the other control unit via the interlink communication line. The interlink communication also provides opportunity to perform plausibility check or crosscheck tasks to increase safety.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

LIST OF REFERENCE NUMBERS

20 A control architecture for a vehicle;
1, 2 Communication network circuits;
3, 4 Control units;
5 Interlink communication line;
6, 7, 8, 9 Commanded units;
10, 11 Communication lines
100 A control method for a control architecture of a vehicle;
110 Connecting a first control unit to a first vehicle communication network;
120 Connecting a second control unit to a second vehicle communication network;
130 Receiving commands by a plurality of commanded units from the first control unit and/or the second control unit over communication lines;
140 Connecting an interlink communication line between the first control unit to the second control unit;
150 transmitting data between the first vehicle communication network and the second control unit through the interlink communication line;
160 transmitting data between the second vehicle communication network and the first control unit through the interlink communication line.

The invention claimed is:

1. A control architecture for a vehicle, comprising:
a first control unit;
a second control unit;
a first vehicle communication network circuit;
a second vehicle communication network circuit, wherein
the first control unit is connected to the first vehicle communication network circuit during normal operation of the first vehicle communication network circuit,
the second control unit is connected to the second vehicle communication network circuit different from the first vehicle communication network circuit during normal operation of the second vehicle communication network circuit, and
a plurality of commanded components are configured to receive commands from the first control unit and/or the second control unit over communication circuit lines, which are separate from the first and second vehicle communication network circuits; and
an interlink communication line separate from the first and second vehicle communication network circuits connects the first control unit to the second control unit, wherein
the first and second control units are communicatively connected to all of the plurality of commanded components,
in a first mode of operation, the first control unit is configured to act as a master controller and the second control unit is configured to act as a slave controller, and
in a second mode of operation, the second control unit is configured to act as a master controller and the first control unit is configured to act as a slave controller.

2. The control architecture according to claim 1, wherein
the control architecture is configured to transmit data between the first vehicle communication network circuit and the second control unit through utilization of the interlink communication line, and
the control architecture is configured to transmit data between the second vehicle communication network circuit and the first control unit through utilization of the interlink communication line.

3. The control architecture according to claim 1, wherein determination of the mode of operation comprises a communication over the interlink communication line.

4. The control architecture according to claim 3, wherein determination of the mode of operation is performed according to an algorithm and aligned over the interlink communication line.

5. The control architecture according to claim 1, wherein determination of the mode of operation is performed by the first control unit and/or the second control unit.

6. The control architecture according to claim 1, wherein the first control unit and the second control unit are configured to utilize the interlink communication line to transmit data between the first and second control units to perform a plausibility check and/or a crosscheck task.

7. A control method for a control architecture of a vehicle, comprising:

a) connecting a first control unit to a first vehicle communication network circuit;
b) connecting a second control unit to a second vehicle communication network circuit;
c) receiving commands by a plurality of commanded components from the first control unit and/or the second control unit over communication circuit lines, which are separate from the first and second vehicle communication network circuits; and
d) connecting an interlink communication line between the first control unit to the second control unit, wherein
   the first control unit is connected to the first vehicle communication network circuit during normal operation of the first vehicle communication network circuit,
   the second control unit is connected to the second vehicle communication network circuit different from the first vehicle communication network circuit during normal operation of the second vehicle communication network circuit,
   the interlink communication line is separate from the first and second vehicle communication network circuits,
   the first and second control units are communicatively connected to all of the plurality of commanded components,
   in a first mode of operation, the first control unit is configured to act as a master controller and the second control unit is configured to act as a slave controller, and
   in a second mode of operation, the second control unit is configured to act as a master controller and the first control unit is configured to act as a slave controller.

8. The method according to claim 7, further comprising:
e) transmitting data between the first vehicle communication network circuit and the second control unit through the interlink communication line; or
f) transmitting data between the second vehicle communication network circuit and the first control unit through the interlink communication line.

* * * * *